United States Patent
Suzuki

[11] Patent Number: 6,035,344
[45] Date of Patent: Mar. 7, 2000

[54] DATA TRANSFER APPARATUS WHICH OUTPUTS DATA BASED UPON A CONTROL SIGNAL

[75] Inventor: Tamotsu Suzuki, Kyoto, Japan

[73] Assignee: Rohm Co., Ltd., Kyoto, Japan

[21] Appl. No.: 09/024,401

[22] Filed: Feb. 17, 1998

Related U.S. Application Data

[63] Continuation of application No. 08/410,517, Mar. 24, 1995, abandoned.

[30] Foreign Application Priority Data

Mar. 25, 1994 [JP] Japan .................................. 6-055370

[51] Int. Cl.⁷ .................................................. G06F 13/00
[52] U.S. Cl. .................................................. 710/1
[58] Field of Search ................... 710/1, 33, 34, 710/106, 22, 71; 711/33, 109, 3; 370/366

[56] References Cited

U.S. PATENT DOCUMENTS

| | | | |
|---|---|---|---|
| 4,510,580 | 4/1985 | Yomogida et al. | 712/245 |
| 4,847,613 | 7/1989 | Sakurai et al. | 340/825.21 |
| 4,931,924 | 6/1990 | Kageura | 395/500 |
| 5,134,699 | 7/1992 | Aria et al. | 710/35 |
| 5,170,469 | 12/1992 | Sako et al. | 710/34 |
| 5,199,105 | 3/1993 | Michael | 710/22 |
| 5,269,002 | 12/1993 | Bourgouin et al. | 711/109 |
| 5,363,486 | 11/1994 | Olson et al. | 711/3 |
| 5,392,403 | 2/1995 | Kaufmann | 710/70 |
| 5,485,583 | 1/1996 | Cunningham et al. | 710/25 |
| 5,504,927 | 4/1996 | Okamoto et al. | 710/58 |
| 5,544,319 | 8/1996 | Acton et al. | 709/246 |
| 5,550,987 | 8/1996 | Tanaka | 710/106 |
| 5,551,052 | 8/1996 | Barnes et al. | 712/1 |
| 5,561,826 | 10/1996 | Davies et al. | 710/71 |
| 5,566,343 | 10/1996 | Nishiguchi | 710/106 |
| 5,600,363 | 2/1997 | Anzaki et al. | 347/237 |
| 5,644,787 | 7/1997 | Nakamura et al. | 710/33 |

*Primary Examiner*—Ayaz R. Sheikh
*Assistant Examiner*—Eric S. Thlang
*Attorney, Agent, or Firm*—Nikaido Marmelstein Murray & Oram LLP

[57] ABSTRACT

A data processor is provided with a data input mode and a data output mode. The data input mode is set by an external signal. A serial data supplied from an external apparatus to a data input register has a signal to specify the start of the operation at its specific bit. The data processor is provided with a circuit which starts to operate by the operation start signal. This circuit generates an operation completion signal. Based on the operation completion signal, the mode of the data processor is automatically changed to the data output mode.

11 Claims, 6 Drawing Sheets

DATA TRANSFER APPARATUS WHICH OUTPUTS DATA BASED UPON A CONTROL SIGNAL

This application is a continuation of application Ser. No. 08/410,517, filed Mar. 24, 1995 and now abandoned.

BACKGROUND OF THE INVENTION

1. Field of the Invention

The present invention relates to a data transfer apparatus, and more particularly, to a data transfer apparatus having a data input mode and a data output mode.

2. Description of the Prior Art

For example, in a semiconductor integrated circuit apparatus, a mode to input data and a mode to output data are necessary in data transfer with a microcomputer. Referring to FIG. 1, there is shown a relevant portion of such a conventional semiconductor integrated circuit apparatus. First, a CE (clock enable) signal, a serial data DA and a clock CK are supplied from a microcomputer 70. When the level of the CE signal is high, a data input mode is set. When the level is low, a data output mode is set.

In the data input mode, the data DA is serially input to an input shift register 76 by the clock CK. The input data is latched once by a latch circuit 77 in synchronism with the fall of the CE signal. During this period, i.e. during the high level period of the CE signal, since an inversion output (low level) of the CE signal inverted by an inverter 75 is applied to an AND gate 78, the AND gate 78 is closed, so that the clock CK is not supplied to an output shift register 81. An AND gate 79 inserted in the output line of the output shift register 81 is also closed.

When the level of the CE signal becomes low, no latch is applied to the latch circuit 77 although the input shift register 76 is operable, so that no data input is performed. The low level CE signal is inverted by the inverter 75 into a high level signal and supplied to the AND gates 78 and 79, so that the output shift register 81 is operable and its output path is conductible through the AND gate 79. Thus, the data processed in the semiconductor integrated circuit apparatus and latched by the latch circuit 80 are serially output through the output shift register 81 and supplied to the microcomputer 70. In FIG. 1, reference numerals 71 to 74 represent terminals of the semiconductor integrated circuit apparatus.

As described above, in the conventional apparatus of FIG. 1, the data input mode is set when the level of the CE signal is high, and the data output mode is set when the level is low. On the other hand, in a conventional apparatus shown in FIG. 2, the data DA includes a data (constituted by several bits) to specify the input mode and the output mode. The data is discriminated by a decoder 82, and based on the discrimination result, a switching circuit 83 switches the input clock to the input shift register 76 or to the output shift register 81. Thereby, the data input mode and the data output mode are set.

However, in the conventional apparatus of FIG. 1, since the data output mode is set when the level of the CE signal becomes low, the output shift register operates in response to the input of the clock CK even when it is unnecessary to output data, so that the power consumption increases and a mis-operation may be caused. In the conventional apparatus of FIG. 2, since the decoder 82 is necessary and it is necessary for the microcomputer 70 to produce a data to specify the input mode and the output mode, necessary software increases and the capacity of a program storing ROM (read only memory) increases.

SUMMARY OF THE INVENTION

An object of the present invention is to provide a data transfer apparatus where an output mode signal is produced by a data processor.

According to the present invention, in a data transfer apparatus provided with a data input mode and a data output mode, the data output mode is automatically set based on an operation completion signal produced by a circuit controlled by a specific bit of a serial data supplied to a data input register from an external apparatus, for example, a microcomputer.

Further, the data transfer apparatus of the present invention is provided with an input shift register which serially inputs a control signal data from an external apparatus in synchronism with a clock, an input latch circuit which latches an output of the input shift register, a signal processing circuit which starts to operate by an output of the input latch circuit corresponding to a specific bit of the serially inputted control signal data and that stops operating after a predetermined period of time to output an operation completion signal, an output latch circuit which latches an output data from the signal processing circuit, an output register which inputs an output of the latch circuit and that serially outputs a data, and a circuit which supplies a clock to the output register in response to a production of the operation completion signal to bring the output register into a data outputting state.

According to such features, a circuit starts to operate by a specific bit of a data inputted from an external apparatus. After completing the operation, the circuit outputs a signal representative of the completion of the operation. Based on the signal, an output circuit such as an output transistor is brought into an output operation condition (i.e. data output mode).

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 3:
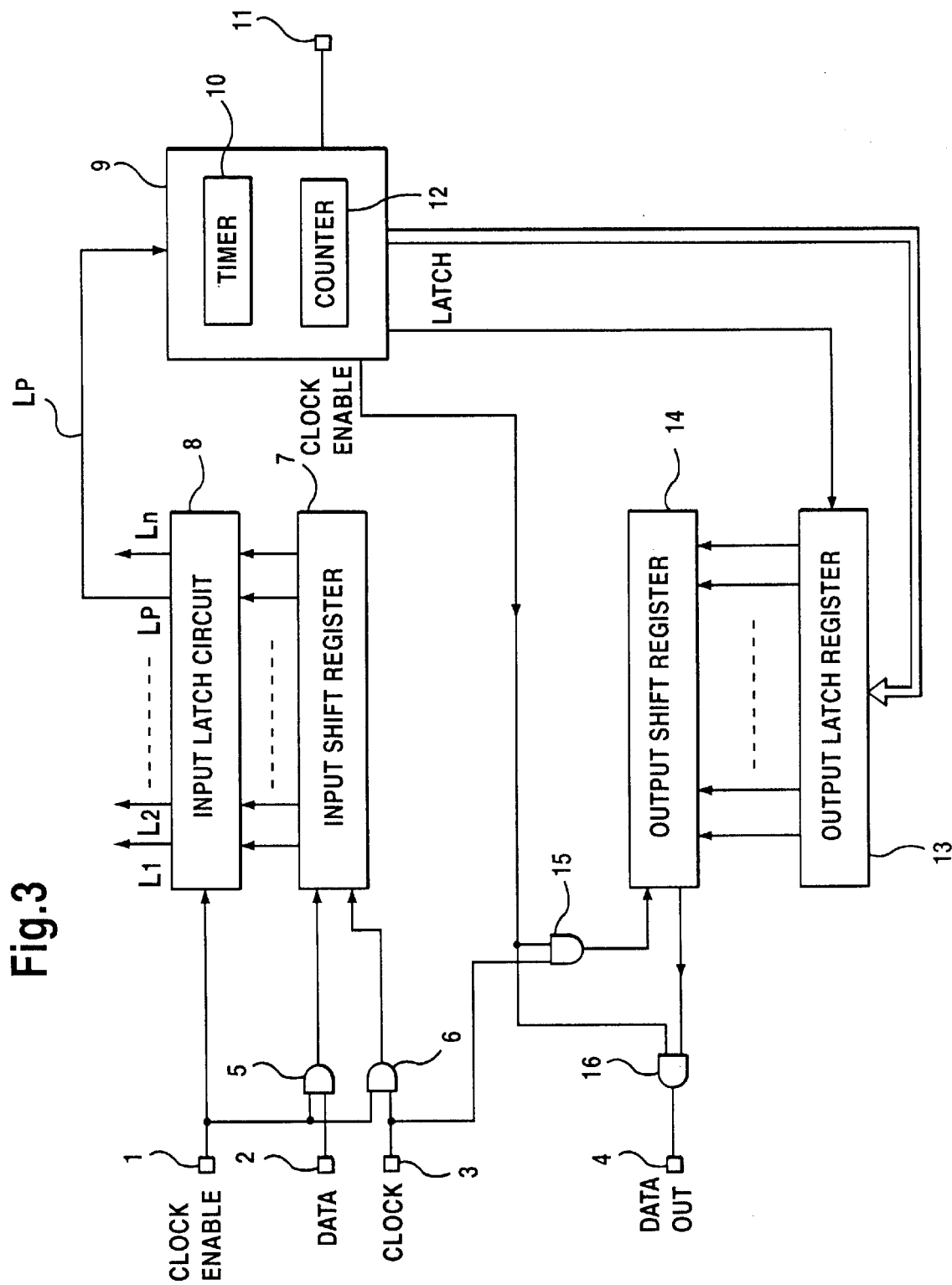
FIG. 3 is a block circuit diagram of a data transfer apparatus of the present invention.

Hereinafter, an embodiment of the present invention will be described. Referring to FIG. 3 showing an embodiment of the present invention, reference numerals 1, 2 and 3 represent terminals for inputting a CE1 (clock enable 1) signal, a control signal data DA and a clock CK from a microcomputer, and reference numeral 4 represents an output terminal for outputting an output data $D_O$ to the microcomputer. Reference numerals 5 and 6 represent AND gates. The AND gate 5 supplies the data DA to an input shift register 7 when the level of the CE1 signal is high. The AND gate 6 supplies the clock CK to the input shift register 7 when the level of the CE1 signal is high. Thus, in the circuit shown in FIG. 3, the input mode is set by the signal CE1 supplied from an external apparatus.

Reference numeral 8 represents a latch circuit for latching data of the input shift register 7 in synchronism with the fall of the CE1 signal. The latch circuit 8 has output lines $L_1, L_2, \ldots,$ and $L_n$ corresponding to the bits of the data. Data supplied to the output lines $L_1, L_2, \ldots,$ and $L_n$ (except the data supplied to an output line $L_p$) are supplied to non-illustrated predetermined circuits to control the circuits. The signal of the line $L_p$ corresponding to a specific bit of the control data DA is supplied to a signal processing circuit 9 to start an operation of the circuit 9.

Figure 5:
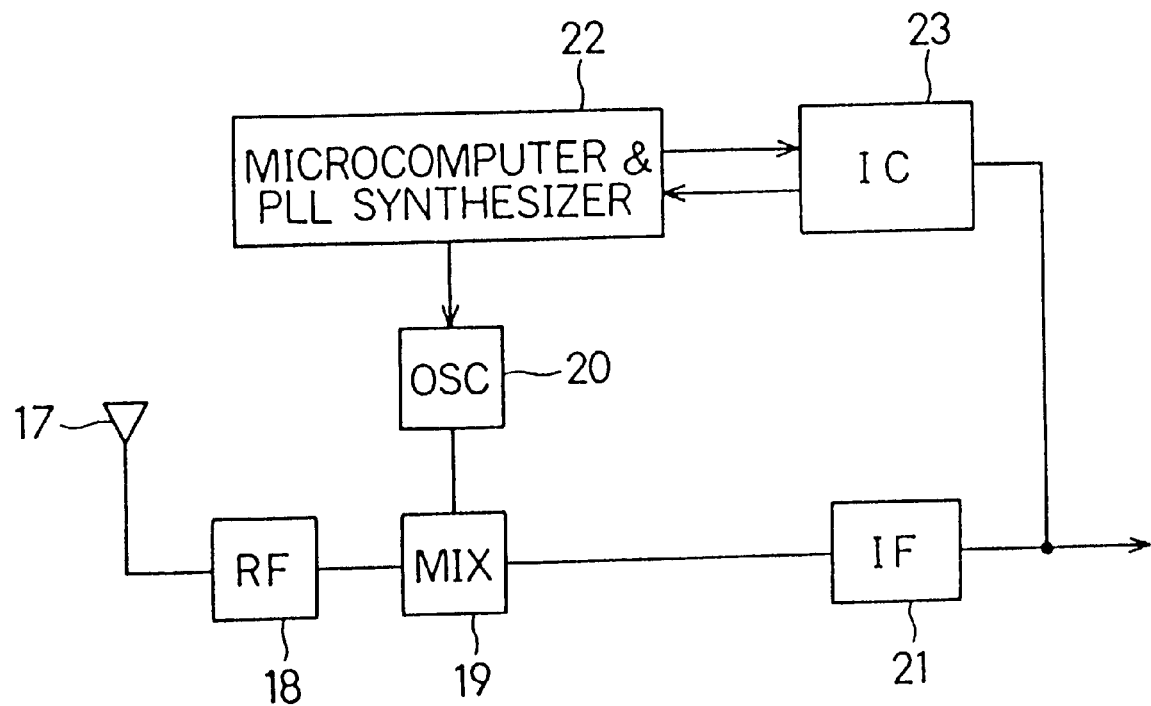
FIG. 5 is a block circuit diagram of the data transfer apparatus used as an automatic searching tuner for use in a radio receiver.

The whole of the circuit of FIG. 3 is formed as one semiconductor integrated circuit apparatus. Assume now that the semiconductor integrated circuit apparatus is an IF (intermediate frequency) counting IC (integrated circuit) 23 for use in a channel selecting apparatus of a radio receiver as shown in FIG. 5. In FIG. 5, reference numeral 17 represents an antenna, reference numeral 18 represents an RF (radio frequency) circuit, reference numeral 19 represents a mixer, reference numeral 20 represents a local oscillating circuit, reference numeral 21 represents an IF circuit, and reference numeral 22 represents a microcomputer and PLL frequency synthesizer. The microcomputer and PLL frequency synthesizer 22 varies the tuning voltage applied to the local oscillating circuit 20 in response to an operation of an automatic searching key for tuning. When the frequency of the IF signal becomes a predetermined value, the variation is stopped and tuning is performed. The IC 23 has a function to detect the frequency of the IF signal.

Returning to FIG. 3, the circuit 9 has a counter 12 for counting the frequency of the IF signal input through the terminal 11. When a signal (high level) on the line $L_p$ is supplied, a timer 10 starts to operate and the counter 12 also starts to operate. The timer 10 stops the counter 12 when 10 msec have elapsed. The output of the counter 12 is supplied to the output latch circuit 13. The circuit 9 outputs a latch pulse FL for latching the data. The circuit 9 also outputs a signal CE2 (high level) representative of the completion of the operation of the circuit 9. The signal CE2 is also supplied to AND gates 15 and 16.

The AND gate 15 is an AND gate for supplying the clock CK to an output shift register 14. When the signal CE2 is supplied, the AND gate 15 directs the clock CK to the output shift register 14. Reference numeral 16 represents an AND gate provided on the output line of the output shift register 14. The AND gate 16 directs the output data Do of the output shift register 14 to the output terminal 4 during the period of the signal CE2.

Figure 4:
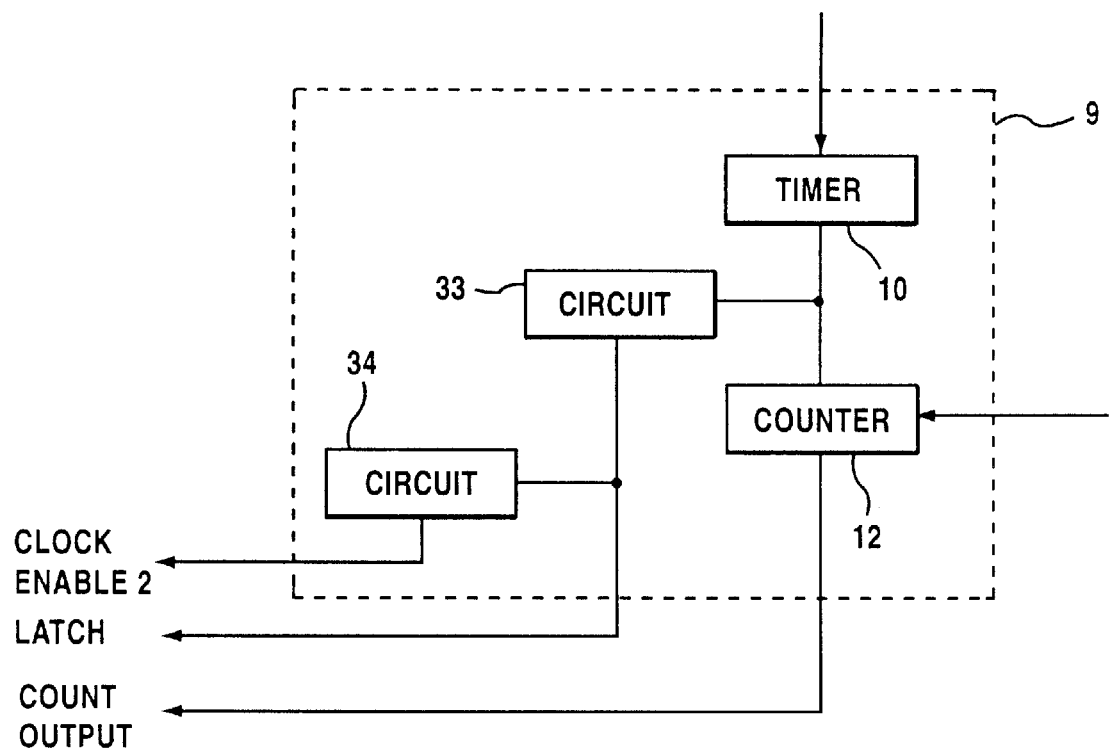
FIG. 4 is a block circuit diagram showing the details of a part of the apparatus of FIG. 3.

Referring to FIG. 4, there are shown the details of the circuit 9. Reference numeral 33 represents a circuit which generates the latch pulse FL in synchronism with the fall of an output ((b) of FIG. 8) of the timer. Reference numeral 34 represents a circuit which outputs the completion signal CE2 that becomes of high level in synchronism with the fall of the latch pulse FL and becomes of low level when a predetermined period of time has elapsed.

Subsequently, an operation of the circuit shown in FIGS. 3 and 4 will be described with reference to the signal waveform charts shown in FIGS. 6 to 8. The CE1 signal supplied from the microcomputer 22 to the terminal 1 is supplied intermittently as shown in (a) of FIG. 7. The data DA input to the terminal 2 during each period of the CE1 signal has at a specific bit ON signals and OFF signals alternately for every periods of the CE1 signal. As shown in (c) of FIG. 7, the level of the output on the output line $L_p$ of the input latch circuit 8 is changed between high and low such that it becomes high at the fall of the CE1 signal by the ON signal of the data DA (see (b) of FIG. 7) during the first period of the CE1 signal, becomes low at the fall of the CE1 signal by the OFF signal during the second period of the CE1 signal, and again becomes high at the fall of the CE1 signal by the ON signal during the third period of the CE1 signal.

Figure 6A:
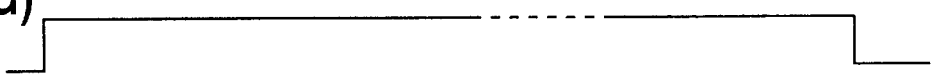
FIGS. 6(a)–(c) are single waveform charts to show taking of input data in the circuit of FIG. 3.
Figure 6B:
Figure 6C:
Figure 7A:
FIGS. 7(a)–(c) are waveform charts of assistance in explaining an operation of the circuit of FIG. 3.
Figure 7B:
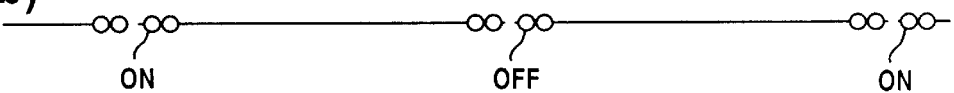
Figure 7C:
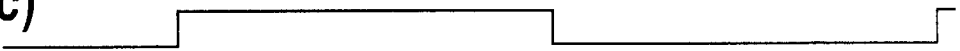
Figure 8A:
FIGS. 8(a)–(g) are waveform charts of assistance in explaining the operation of the circuit of FIG. 3.
Figure 8B:
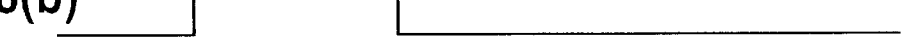
Figure 8C:
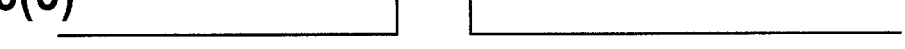
Figure 8D:
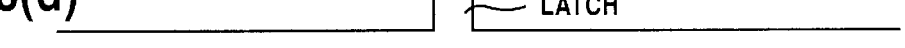
Figure 8E:
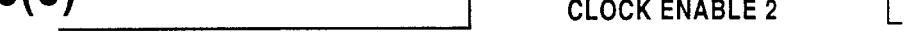
Figure 8F:
Figure 8G:
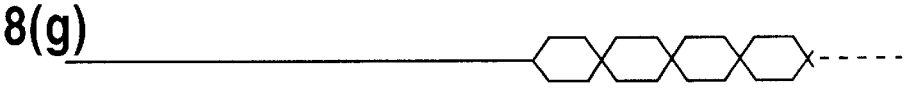

FIG. 6 shows that the input data DA ((c) of FIG. 6) are successively taken in the input shift register 7 by the clock CK ((b) of FIG. 6) during the period of the CE1 signal shown in (a) of FIG. 6. DP represents the specific data representative of ON and OFF. The data comprises one bit. The data DP is output from the input shift register 7 to the line $L_p$ by way of the input latch circuit 8. As described above, when the data DP represents ON, a high level signal is output to the line $L_p$, and when the data DP represents OFF, a low level signal is output.

When the data DP represents ON and a high level signal ((a) of FIG. 8) is output to the line $L_p$, at the circuit 9, the timer 10 starts to operate and its output becomes of high level. When 10 msec have elapsed, the output of the timer 10 becomes of low level. (b) of FIG. 8 shows the output of the timer 10. During the high level period of the output of the timer 10 (i.e. during the 10 msec), the counter 12 counts the frequency of the IF signal input through the terminal 11.

In synchronism with the fall of the output of the timer 10, the latch pulse generating circuit 33 generates a pulse with a width of 30 $\mu$sec ((c) of FIG. 8) and after 15 $\mu$sec from the rise of the pulse, generates a latch pulse FL ((d) of FIG. 8) with a width of 15 $\mu$sec. The completion signal producing circuit 34 produces the completion signal CE2 which rises in synchronism with the fall of the latch pulse FL. The signal CE2 (high level) has a time width sufficient for outputting the data of the output shift register 14.

During the production of the signal CE2, the AND gate 15 is conductible, so that the clock CK is supplied to the output shift register 14. The AND gate 16 is also conductible. Consequently, the IF frequency count data serially output from the output shift register 14 is supplied to the microcomputer and PLL frequency synthesizer 22 through the output terminal 4.

Figure 1:
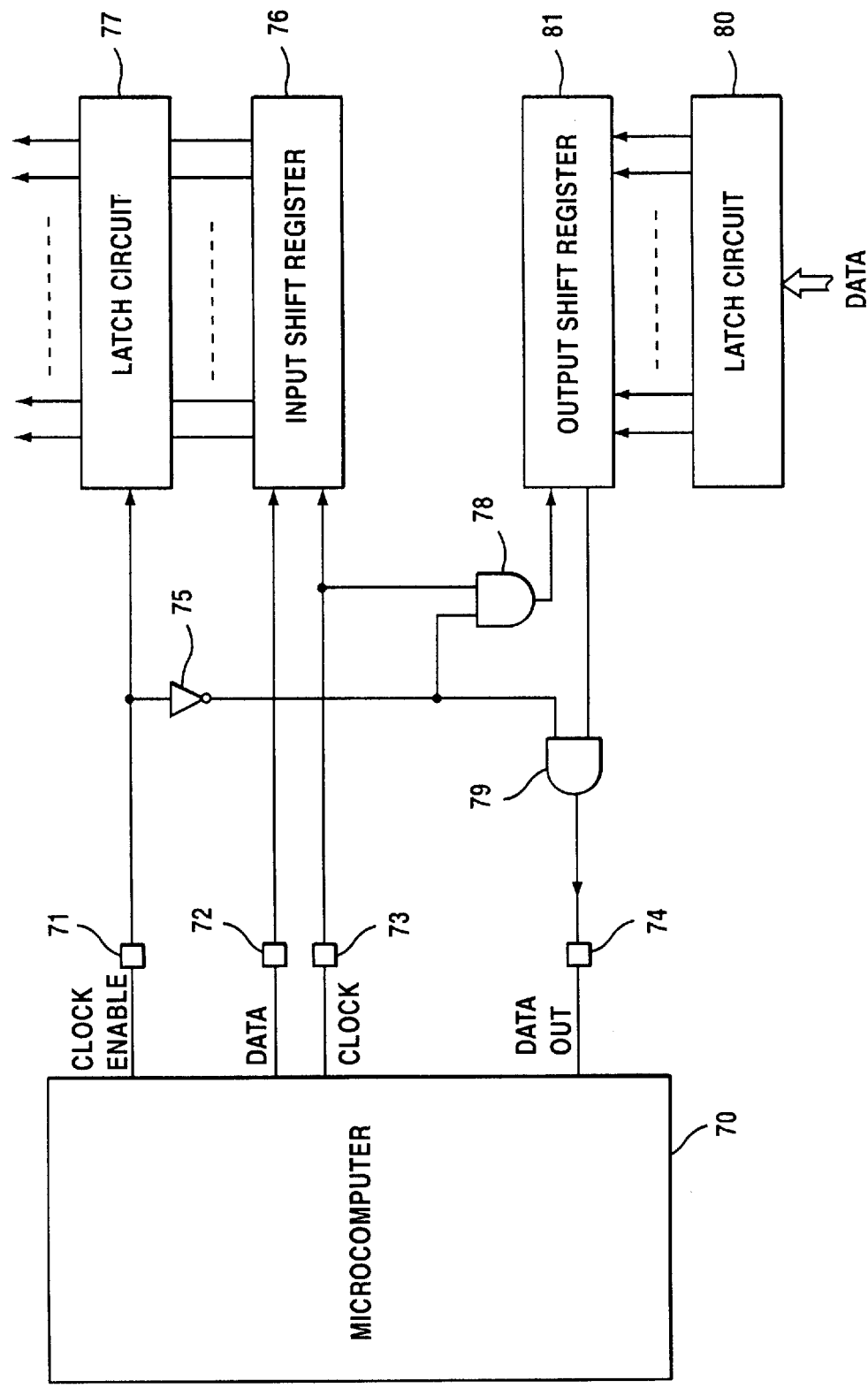
FIG. 1 is a block circuit diagram of a conventional data transfer apparatus.
Figure 2:
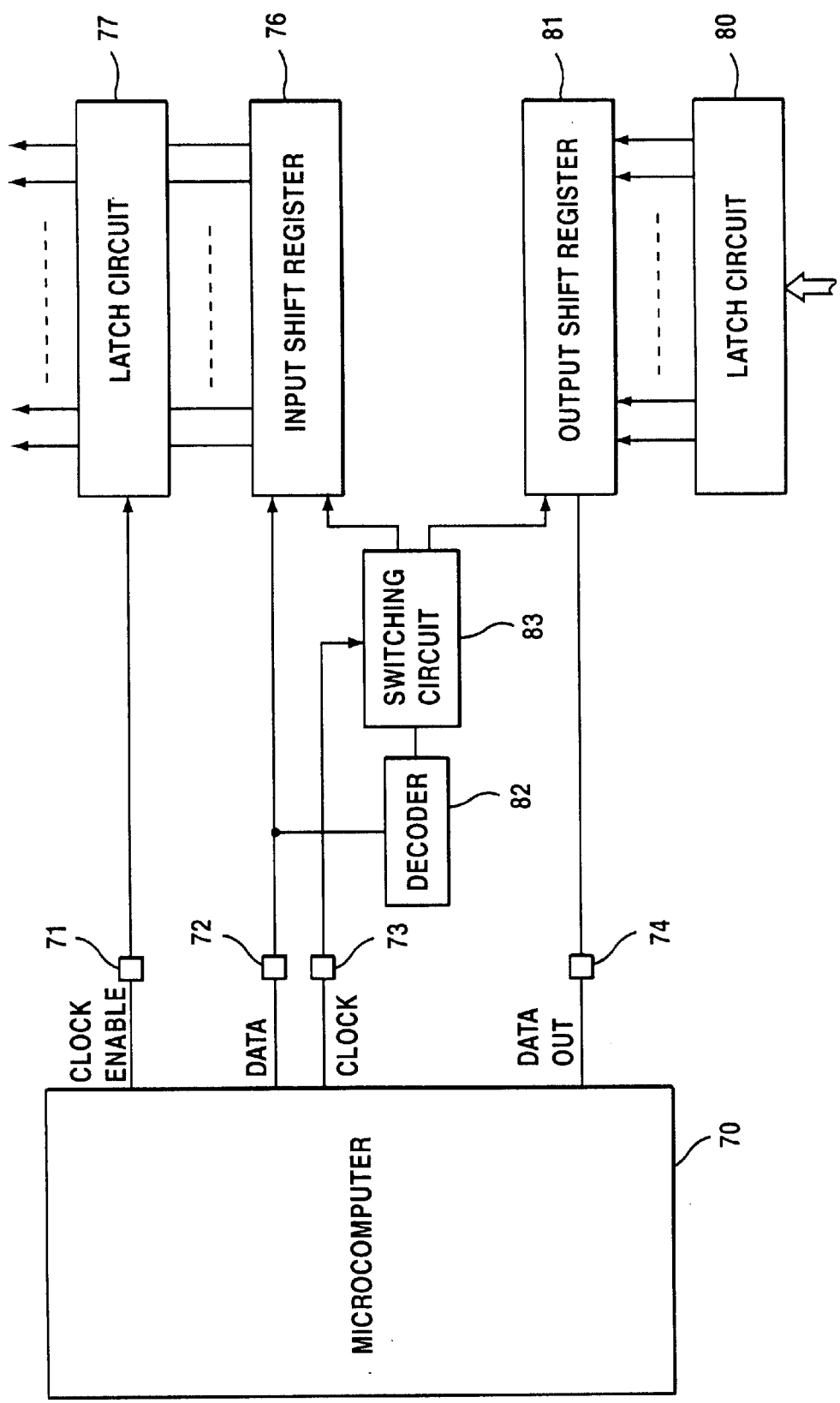
FIG. 2 is a block circuit diagram of another conventional data transfer apparatus.

As described above, according to the present invention, while the data input operation condition is realized by a signal supplied from an external apparatus, the data output operation condition is realized by a signal produced by a circuit operated by a specific bit of a data taken from an external apparatus. Therefore, compared to the conventional apparatus of FIG. 1 which is in the output operation condition all through the low level period of the CE signal, in the present invention, the output operation period is arbitrarily set, and the reduction in power consumption is expected. In addition, a special decoder as shown in the conventional apparatus of FIG. 2 is unnecessary to set the input and output operation conditions.

Obviously, many modifications and variations of the present invention are possible in light of the above teachings. It is therefore to be understood that within the scope of the appended claims, the invention may be practiced other than as specifically described.

What is claimed is:

1. A data transfer apparatus comprising:
    an input shift register which serially inputs a control signal data from an external apparatus in synchronism with a clock;
    an input latch circuit, connected to said input shift register, which latches an output of the input shift register;
    a signal processing circuit, connected to said input latch circuit, which starts to operate by an output of the input latch circuit corresponding to a specific bit of the serially input control signal data, said signal processing circuit stopping operating after a predetermined period of time to output an operation completion signal;
    an output latch circuit, connected to said signal processing circuit, which latches an output data from the signal processing circuit;
    an output shift register, connected to said output latch circuit, which inputs an output of the output latch circuit, said output shift register serially outputting a data; and
    a circuit connected to said signal processing circuit and to said output shift register, said circuit supplies a clock to the output shift register in response to a production of the operation completion signal to bring the output shift register into a data outputting state.

2. A data transfer apparatus according to claim 1, wherein an input terminal is provided for inputting a pulse intermittently supplied from the external apparatus, and wherein the input shift register inputs the control signal data during a period of the input pulse, and wherein the latch circuit performs a latch operation in synchronism with a termination of the pulse.

3. A data transfer apparatus comprising;
    an input shift register which serially inputs a control signal data from an external apparatus in synchronism with a clock;
    an input latch circuit, connected to said input shift register, which latches an output of the input shift register;
    a signal processing circuit, connected to said input latch circuit, which starts to operate by an output of the input latch circuit corresponding to a specific bit of the serially input control signal data, said signal processing circuit stopping operating after a predetermined period of time to output an operation completion signal;
    an output latch circuit, connected to said signal processing circuit, which latches an output data from the signal processing circuit;
    an output register, connected to said output latch circuit, which inputs an output of the latch circuit, said output register serially outputting a data; and
    a circuit, connected to said signal processing circuit and said output register, which supplies a clock to the output register in response to a production of the operation completion signal to bring the output register into a data outputting state, wherein said signal processing circuit comprising:
    a timer which starts to operate by an output of the input latch circuit corresponding to the specific bit, said timer stopping operating after the predetermined period of time;
    an input terminal for inputting another signal supplied from an external apparatus; and
    a counter which performs a counting operation to detect a frequency of the another signal while timer is operating, an output of said counter being latched by the output latch circuit as the output data.

4. A data transfer apparatus according to claim 3, wherein an output latch signal producing circuit is provided which outputs a latch signal in synchronism with a completion of an operation of the timer to supply the latch signal to the latch circuit.

5. A data transfer apparatus according to claim 4, wherein said signal processing circuit has an operation completion signal producing circuit which produces the operation completion signal in synchronism with and behind the output latch signal.

6. A data transfer apparatus comprising:
    an input shift register which serially inputs a control signal data from an external apparatus in synchronism with a clock;
    an input latch circuit, connected to said input shift register, which latches an output of the input shift register;
    a signal processing circuit, connected to said input latch circuit, which starts to operate by an output of the input latch circuit corresponding to a specific bit of the serially input control signal data, said signal processing circuit stopping operating after a predetermined period of time to output an operation completion signal;
    an output latch circuit, connected to said signal processing circuit, which latches an output data from the signal processing circuit;
    an output register, connected to said output latch circuit, which inputs an output of the latch circuit, said output register serially outputting a data; and
    a circuit, connected to said signal processing circuit and said output register, which supplies a clock to the output register in response to a production of the operation completion signal to bring the output register into a data outputting state, wherein said control signal data from the external apparatus is supplied every predetermined periods of time, and wherein a control signal data next to a control signal data having an ON signal at the specific bit has an OFF signal at the specific bit.

7. A data transfer apparatus according to claim 6, wherein a voltage level of the output of the input latch circuit corresponding to the specific bit is changed from a first voltage level to a second voltage level by the ON signal and is changed from the second voltage level to the first voltage level by the OFF signal.

8. A data transfer apparatus according to claim 7, wherein said signal processing circuit starts to operate by an input of the second voltage level.

9. A data transfer apparatus according to claim 8, wherein said signal processing circuit comprising:
    a timer which starts to operate by an input of the second voltage level, said timer stopping operating after the predetermined period of time; and
    a circuit which produces the operation completion signal based on a completion of an operation of the timer.

10. A data transfer apparatus comprising:
    a first terminal for receiving a clock enable signal;
    a second terminal for receiving data;
    a third terminal for receiving clock pulses;
    a first AND gate connected to the first and second terminals so that the clock enable signal and the data are applied thereto;
    a second AND gate connected to the first and third terminals so that the clock enable signal and the clock pulses are applied thereto;

an input shift register to which outputs of the first and second AND gates are applied;

an input latch circuit connected to the first terminal so that the clock enable signal is applied thereto and connected to the input shift register so that an output from the input shift register is latched in accordance with the clock enable signal;

a data generating circuit connected to a predetermined output path of a plurality of output paths of the input latch circuit, the data generating circuit generating output data in accordance with a signal provided through the predetermined output path and generating a termination signal having a predetermined voltage level;

an output latch register for latching output data from the data generating circuit;

a third AND gate connected to the data generating circuit and to the third terminal so that the termination signal and the clock pulses are applied thereto;

an output shift register connected to the output latch register and to the third AND gate so that data received from the output latch register is output serially in synchronism with the clock pulses;

a fourth AND gate to which an output from the output shift register and the termination signal are supplied; and an output terminal to which an output signal from the fourth AND gate is applied for output.

11. A data transfer apparatus comprising:

an input shift register which serially inputs a control signal data from an external apparatus in synchronism with an external clock;

an input latch circuit, connected to said input shift register, which latches an output of the input shift register;

a signal processing circuit, connected to said input latch circuit, which starts to operate by an output of the input latch circuit corresponding to a specific bit of the serially input control signal data, said signal processing circuit stopping operating after a predetermined period of time to output an operation completion signal;

an output latch circuit, connected to said signal processing circuit, which latches an output data from the signal processing circuit; and an output shift register, connected to said output latch circuit, which outputs the output data in synchronism with said external clock only during another predetermined period produced by the operator completion signal.

* * * * *